(12) United States Patent
Vaghani et al.

(10) Patent No.: US 9,032,170 B2
(45) Date of Patent: May 12, 2015

(54) METHOD FOR REPLICATING A LOGICAL DATA STORAGE VOLUME

(71) Applicant: VMware, Inc., Palo Alto, CA (US)

(72) Inventors: Satyam B. Vaghani, San Jose, CA (US); Nikhil C. Jagtiani, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 278 days.

(21) Appl. No.: 13/660,846

(22) Filed: Oct. 25, 2012

(65) Prior Publication Data

US 2013/0046948 A1  Feb. 21, 2013

Related U.S. Application Data

(63) Continuation of application No. 11/431,277, filed on May 9, 2006, now Pat. No. 8,321,643.

(51) Int. Cl.
*G06F 12/02* (2006.01)
*G06F 11/14* (2006.01)
*G06F 3/06* (2006.01)

(52) U.S. Cl.
CPC .......... *G06F 11/1448* (2013.01); *G06F 3/0665* (2013.01); *G06F 3/0604* (2013.01); *G06F 3/0629* (2013.01); *G06F 3/067* (2013.01)

(58) Field of Classification Search
None
See application file for complete search history.

(56) References Cited

U.S. PATENT DOCUMENTS

| 6,633,962 | B1 | 10/2003 | Burton et al. |
| 8,321,643 | B1 | 11/2012 | Vaghani et al. |
| 2003/0167327 | A1 | 9/2003 | Baldwin et al. |
| 2004/0167972 | A1 | 8/2004 | Demmon |
| 2006/0248273 | A1 | 11/2006 | Jernigan et al. |

*Primary Examiner* — Charles Rones
*Assistant Examiner* — Ryan Dare

(57) ABSTRACT

Replicated data storage units are autonomously identified and assembled into generationally related data storage volumes. A data storage manager, implementing a re-signaturing process executed at defined intervals or manually initiated on a server or client system connected to the storage area network, scans the collection of visible data storage units to identify those related as a data storage volume. Each replicated data storage unit includes metadata that embeds an identification of the replicated data storage unit and volume accessible to the data storage manager. To assemble a set of replicated data storage units into a generational volume, the data storage unit metadata is rewritten to establish a unique data storage volume identity including information to associate the data storage volume in a lineage with the source data storage volume.

20 Claims, 7 Drawing Sheets

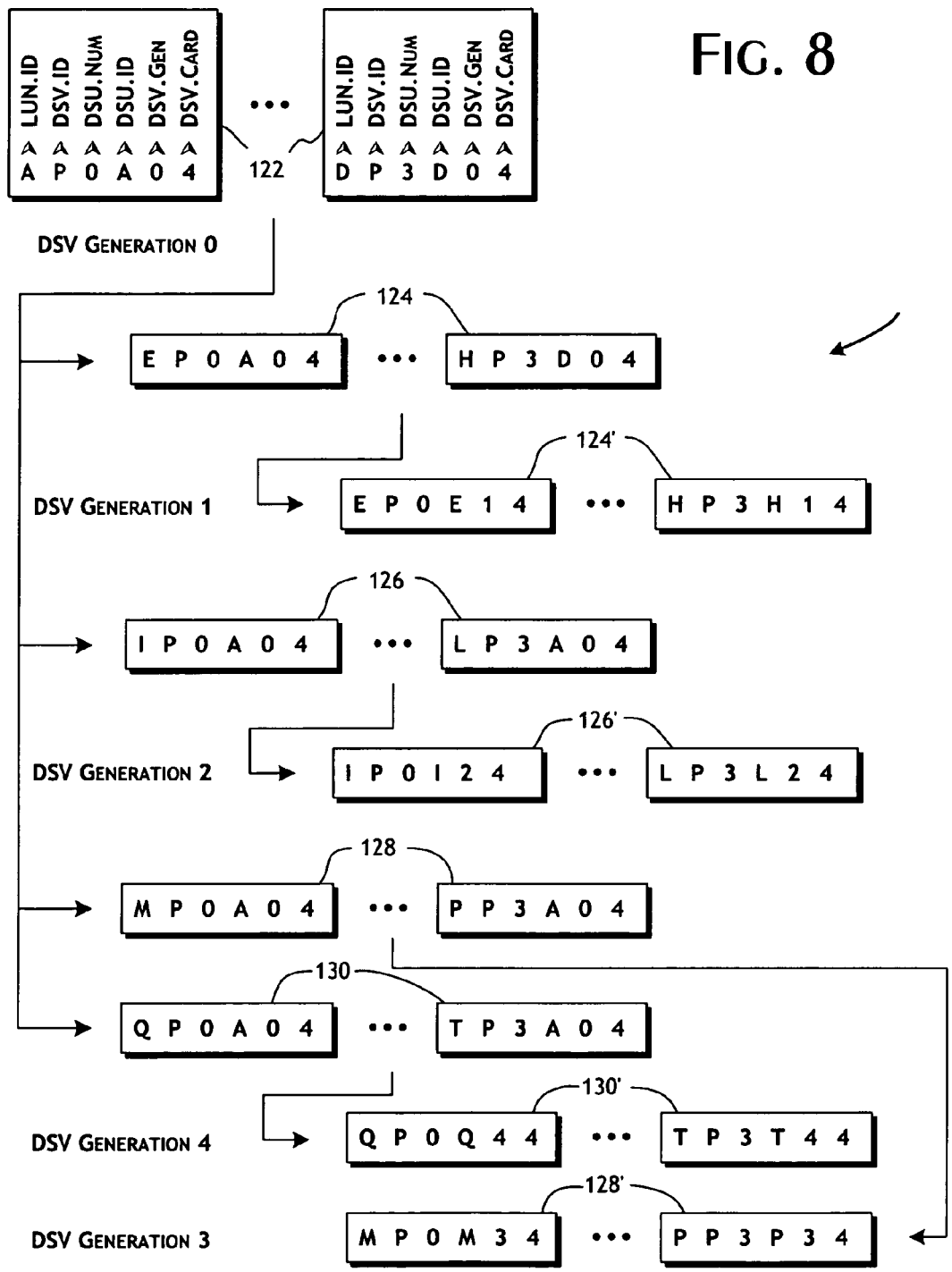

ically implemented intermediate between the driver and conventional operating system filesystem layers, supports volume oriented virtualization and management of the LUNs accessible through the host bus adapter. Multiple LUNs can be gathered and managed together as a volume under the control of the logical volume manager for presentation to and use by the filesystem layer as an integral LUN.
METHOD FOR REPLICATING A LOGICAL DATA STORAGE VOLUME

CROSS-REFERENCE TO RELATED APPLICATIONS

This application is a continuation of U.S. patent application Ser. No. 11/431,277 filed May 9, 2006, and entitled "System and Methods for Automatically Re-Signaturing Multi-Unit Data Storage Volumes in Distributed Data Storage Systems," which is incorporated by reference herein.

BACKGROUND OF THE INVENTION

1. Field of the Invention

The present invention is generally related to the management and control of distributed virtual storage systems and, in particular, to the management and re-signaturing of data storage units within distributed virtual storage systems.

2. Description of the Related Art

As computer systems scale to enterprise levels, particularly in the context of supporting large-scale data centers, the underlying data storage systems frequently adopt the use of storage area networks (SANs). As is conventionally well appreciated, SANs provide a number of technical capabilities and operational benefits, fundamentally including virtualization of data storage devices, redundancy of physical devices with transparent fault-tolerant fail-over and fail-safe controls, geographically distributed and replicated storage, and centralized oversight and storage configuration management decoupled from client-centric computer systems management.

Architecturally, a SAN storage subsystem is characteristically implemented as a large array of Small Computer System Interface (SCSI) protocol-based storage devices. One or more physical SCSI controllers operate as the externally accessible targets for data storage commands and data transfer operations. The target controllers internally support bus connections to the data storage devices, identified as logical units (LUNs). The storage array is collectively managed internally by a storage system manager to virtualize the physical data storage devices. That is, the SCSI storage devices are internally routed and respond to the virtual storage system manager as functionally the sole host initiator accessing the SCSI device array. The virtual storage system manager is thus able to aggregate the physical devices present in the storage array into one or more logical storage containers. Virtualized segments of these containers can then be allocated by the virtual storage system as externally visible and accessible LUNs with uniquely identifiable target identifiers. A SAN storage subsystem thus presents the appearance of simply constituting a set of SCSI targets hosting respective sets of LUNs. While specific storage system manager implementation details differ as between different SAN storage device manufacturers, the desired consistent result is that the externally visible SAN targets and LUNs fully implement the expected SCSI semantics necessary to respond to and complete initiated transactions against the managed container.

A SAN storage subsystem is typically accessed by a server computer system implementing a physical host bus adapter (HBA) that connects to the SAN through network connections. Within the server, above the host bus adapter, storage access abstractions are characteristically implemented through a series of software layers, beginning with a low-level SCSI driver layer and ending in a operating system specific filesystem layer. The driver layer, which enables basic access to the target ports and LUNs, is typically vendor specific to the implementation of the SAN storage subsystem. A data access layer may be implemented above the device driver to support multipath consolidation of the LUNs visible through the host bus adapter and other data assess control and management functions. A logical volume manager (LVM), typically implemented intermediate between the driver and conventional operating system filesystem layers, supports volume oriented virtualization and management of the LUNs accessible through the host bus adapter. Multiple LUNs can be gathered and managed together as a volume under the control of the logical volume manager for presentation to and use by the filesystem layer as an integral LUN.

In typical implementation, SAN systems connect with upper-tiers of client and server computer systems through a communications matrix frequently implemented using a Fibre Channel (FC) based communications network. Logically, a Fibre Channel network is a bidirectional, full-duplex, point-to-point, serial data channel structured specifically for high performance data communication. Physically, the Fibre Channel is an interconnection of multiple communication ports, called N_Ports, implemented by the host bus adapters and target controllers. These communication ports are interconnected by a switching network deployed as a n-way fabric, a set of point-to-point links, or as an arbitrated loop.

Strictly defined, Fibre Channel is a generalized transport mechanism that has no high-level data flow protocol of its own or native input/output command set. While a wide variety of existing Upper Level Protocols (ULPs) can be implemented on Fibre Channel, the most frequently implemented is the SCSI protocol. The SCSI Fibre Channel Protocol (FCP) standard defines a Fibre Channel mapping layer that enables transmission of SCSI command, data, and status information between a source host bus adapter, acting as a SCSI initiator, and a destination SCSI target controller, over any Fibre Channel connection path as specified by a Fibre Channel path identifier. As defined relative to a target, a FC path identifier is a reference to the destination port and logical unit of the SAN storage system. The port is uniquely specified by a World Wide Port Name (WWPN). The LUN identifier is a unique, hardware independent SCSI protocol compliant identifier value retrievable in response to a standard SCSI Inquiry command.

A common alternative transport mechanism to Fibre Channel is defined by the Internet Small Computer System Interface (iSCSI) standard. Instead of relying on a new FC media infrastructure, the iSCSI standard is designed to leverage existing TCP/IP networks including specifically the existing mixed-media infrastructure, including typical intranet and internet networks, and to use internet protocol (IP) layer for upper-level command and data transport. Unlike Fibre Channel, the SCSI protocol is the exclusive upper-level protocol supported by iSCSI. That is, the iSCSI protocol semantics (IETF Internet Draft draft-ietf-ips-iSCSI-08.txt; www.ietf.org) specifically requires the transmission of SCSI command, data, and status information between SCSI initiators and SCSI targets over an IP network. Similar to the FC path, an iSCSI path, as specified by a SCSI initiator, is a combination of a target IP address and LUN identifier.

SAN virtualization of client LUNs enables a number of specific capabilities, including a more efficient use of the storage space within a particular container, dynamic extensibility and reconfiguration of the container storage space by adding and replacing physical devices and shifting unused storage space between localized containers, and comprehensive management of the virtual LUNs. In addition, modern SAN systems enable multiple network path (multipath) access between the SAN connected computer systems and multiple, different physical SAN storage systems. Multipath routing functionally enables configuration of redundant network connections and channel bonding to achieve fundamental increases in the total available bandwidth between clients and their data stores.

A particular benefit of conventional SAN systems is the ability to implement consistent, system-oriented data integrity protection policies. Given the scope of data stored by individual SANs, overall storage system reliability and ongoing data integrity are baseline requirements. To provide the various real-time, hot-backup, and similar capabilities of conventional SAN systems, these systems will typically implement a periodic or administratively driven data replication-based data integrity protection scheme. Persistently scheduled checkpoint events are typically used to initiate image replication, also referred to as snap-shot copy, of established, externally visible LUNs. Subject to the details of the various sparse and progressive data copy techniques that may be used by any particular proprietary SAN implementation, each checkpoint event drives the creation of point-in-time copies of the event-specified externally visible LUNs.

Administratively, checkpoints will be set to encompass full client computer system volumes in order to preserve potential internal data dependencies between the LUNs that make up individual volumes. LUN replication services, as implemented by SAN systems, conventionally executes independent of volume identification; snap-shot copies are made of individual, externally visible LUNs without regard to volume participation. To prevent logical identification collisions between the source LUNs and replicated LUN copies, the check-point LUN copies are marked inactive integral to the copy process. Thus, beyond possibly initial administrative identification of LUNs for replication, there is little required administrator intervention and essentially no user visible burden arising from the direct execution of LUN replication operations.

Although a generally infrequent requirement, various circumstances may require a rollback of a client computer system volume to a prior point-in-time. In other circumstances, a user may wish to have concurrent access to both a prior checkpointed instance and the current instance of a volume. Unfortunately, restoring a checkpointed volume or simply making a checkpointed volume currently accessible is typically burdensome. Conventionally, a manual selection operation is required to parse through all of the prior replicated LUNs to select just the single consistent set of LUNs that represent a specific, desired point-in-time replicated volume. Given the multiplicity of checkpoint events, the number of LUNs under management by a SAN system, and the number of SAN systems within the use scope of a given server computer system, the process of identifying, validating, restoring, and mounting a prior replicated volume set of LUNs is complex and time consuming. Moreover, manually managed volume restoration presents a significant risk that the data integrity of the restored volume will not be maintained. If the integrity of a restored volume is lost, then the integrity of one if not multiple other replicated generations of volumes will be corrupted.

Even where a proper set of replicated LUNs are identified for restoration, restoring a prior copy of a current volume is complicated by the inherent duplicate nature of the replicated LUNs. As expected, the internal data structures of the replicated LUNs, including the LUN internal metadata, are preserved by the replication process. Remounting a prior point-in-time copy of a volume can create an identity ambiguity since the replicated LUNs will report their original LUN identifiers. Furthermore, since there is no default defined manner of handling the LUNs of replicated volumes in a SAN environment, different client computer systems may operate inconsistently in recognizing the identity of the LUNs that constitute a currently active volume. Inconsistent recognition of LUNs is of particular concern given that current and replicated LUNs are not guaranteed visible to all client computer systems at all times in a SAN environment. Even where a volume consists of just a single LUN, different client computer system could fail to distinguish which is the currently active volume, leading to inconsistent use.

Client-based software and protocols to resolve these ambiguities create a further layer of complexity, are dependent on the mutual communication between the client computer systems, and requires reliable connectivity to ensure continuous communication. Therefore, before a replicated LUN set can be mounted by any client computer system as an active volume, the replicated LUNs must be suitably re-signatured to ensure both LUN and volume uniqueness within the scope of any accessing client or server computer system. Conventional administrative tools do support the rewriting of selected LUN identifiers and volume signatures as part of the manual process of selecting and remounting a prior point-in-time volume. Still, this re-signaturing process is an additional and required step in the already complicated manual process of enabling access to a prior point-in-time copy of a volume. Additional complexities arise in the context of rollbacks where there is a need to repeatedly select between and activate multiple replicated volumes, while ensuring that the original state of the client computer systems volumes can be maintained and reliably restored.

Therefore, particularly as the use of SAN systems and reliance on internal replication services grows, there is a present need for users to be able to easily, reliably, and preferably transparently, manage and maintain LUN volume sets to enable rollback and remounting of checkpointed data storage volumes.

SUMMARY OF THE INVENTION

Thus, a general purpose of the present invention is to provide an autonomous mechanism for recognizing and assembling data volumes from data storage units created automatically by the ongoing replication services provided by SAN storage devices.

This is achieved in the present invention by providing a system wherein replicated data storage units are autonomously identified and assembled into generationally related data storage volumes. A data storage manager, implementing a re-signaturing process executed on a server or client system connected to the storage area network, scans, at predetermined intervals, the collection of visible data storage units to identify those related as a data storage volume. Each replicated data storage unit includes metadata that embeds an identification of the replicated data storage unit and volume accessible to the data storage manager. To assemble a set of replicated data storage units into a generational volume, the data storage unit metadata is rewritten to establish a unique data storage volume identity including information to associate the data storage volume in a lineage with the source data storage volume.

An advantage of the present invention is that replicated data volumes are made available through reassembly with a certainty of maintaining data integrity both within the assembled data volume and as among the collection of data storage units that may be visible to a client computer system at any given time.

Another advantage of the present invention is that the assembly of replicated data storage units into volumes proceeds effectively independent of the potentially proprietary replication processes implemented by any particular storage area device. The re-signaturing process of the present invention is capable of proceeding on an independent schedule that, relative to the SAN, only depends on the current visibility of the necessary data storage units within the data storage network to proceed with and complete reassembly.

A further advantage of the present invention is that once the re-signaturing process is administratively established, the process of re-signaturing replicated data storage units to support reassembly proceeds autonomously with respect to both users and administrators. The present invention provides for the autonomous re-signaturing of replicated data storage volumes into a corresponding generationally related series of data storage volumes that are then available for mounting or use in a roll-back operation.

Still another advantage of the present invention is that the re-signaturing process is fully qualified based on the data present and accessible from the data storage units of the replicated data storage volumes. The decision of whether a given data storage unit needs to be re-signatured can be determined from the data storage unit itself without reference to any other data storage unit.

Yet another advantage of the present invention is that the re-signaturing process is self-deterministic in recognizing and processing volume related sets of data storage units. Instances of the re-signaturing process run from different host computer systems against the same SAN storage systems will realize the same end result. The re-signaturing process of the present invention is thus capable of concurrent, fully distributed execution without fault and therefore well suited for automated use with SANs and other storage systems supporting distributed access to data storage volumes.

BRIEF DESCRIPTION OF THE DRAWINGS

FIG. 8 details a more complicated replication and reassembly progression as implemented in a preferred embodiment of the present invention;

DETAILED DESCRIPTION

Figure 1:
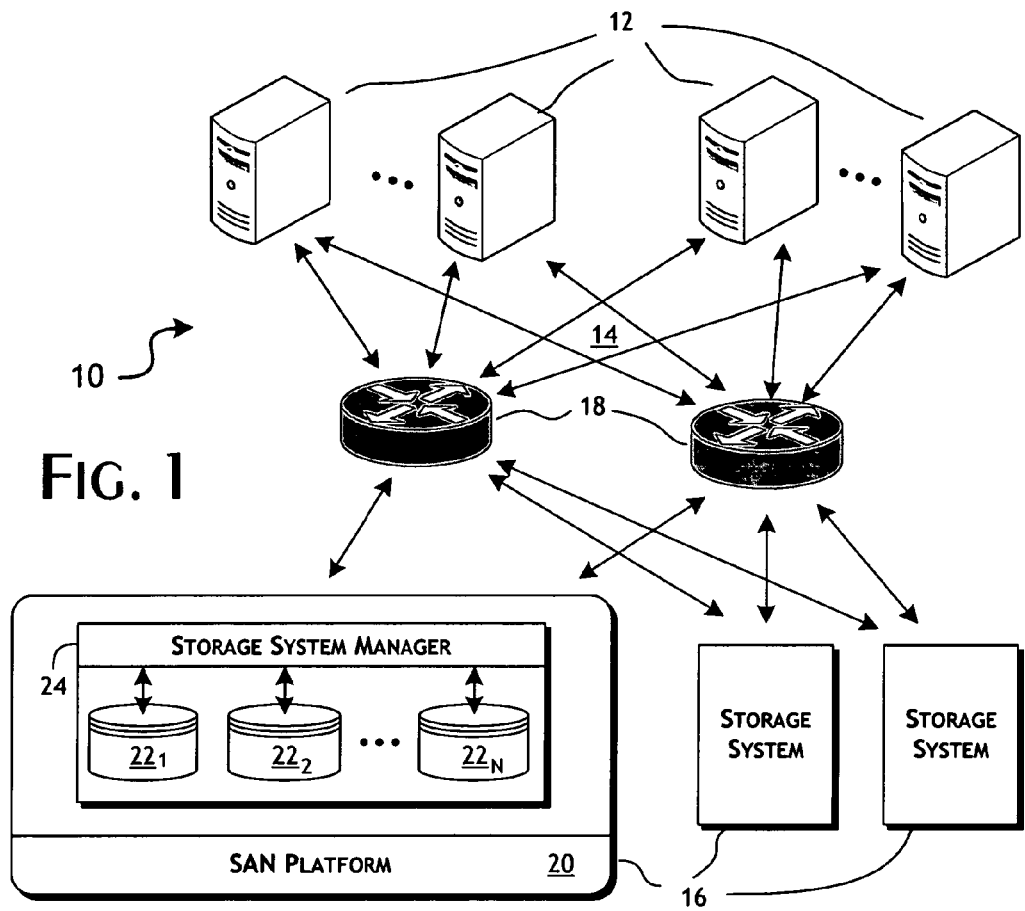
FIG. 1 is an architectural system schematic illustrating an intended operating environment of a preferred embodiment of the present invention.

The present invention is generally applicable in computing environments where data storage volumes used by client computer systems are managed within a distributed storage system that supports typically automatic data replication operations. Accordingly, a preferred environment for the implementation of the present invention is in otherwise conventional storage area network (SAN) based data centers. From the following detailed description of the invention, however, those of ordinary skill in the art will readily understand that the present invention is not constrained to use in a particular environment, system or network architecture or by use of a particular operating system or set of data communications protocols. The following description of the present invention is presented in the context of a data center application as illustrative of a preferred embodiment for clarity of presentation and explanation. Also for clarity of description, as used in the following detailed description of the invention, like reference numerals are used to designate like parts depicted in one or more of the figures.

As generally shown in FIG. 1, a preferred data center 10 hosted implementation of the present invention typically supports one or more tiers of computer systems 12 that, directly as clients or as servers operating indirectly on behalf of one or more upper tiers of client and server computer systems, provides access to logical units of storage hosted by a SAN 14 and underlying data storage systems 16. The SAN 14 can be implemented using any of a variety of technologies, though typically using Fibre Channel or iSCSI technology. These technologies allow construction of a redundant, failover and multipath capable interconnection network, using for example redundant routers 18 and network connections, that in turn ensures overall reliability. In a typical implementation, additional data management features are implemented through logical volume managers and data access layers executed in a server tier of computer systems 12. Client computer systems are constrained to mounting and accessing data storage volumes through the server tier and thereby effectively inherit the logical unit management functions implemented by the logical volume managers of the server tier. Logical volume managers, however, can be and frequently are implemented at multiple levels including in client computer systems.

The different potential locations of logical storage managers are generally not significant to the operation of the SAN 14 and, in particular, the underlying data storage systems 16. While the SAN 14 provides routeable multipath access, the data storage systems 16 presents a relatively large collection of externally visible LUNs, also referred to in the context of the present invention as data storage units (DSUs), accessible by the computer systems 12, subject to conventional access controls. Individually, the data storage systems 16 are relatively conventional computer platforms 20, though specialized to support typically high-bandwidth fibre channel network interfaces and to host large parallel arrays of typically SCSI-based disk drive storage units 22$_1$-N. Aggregate network bandwidth at the SAN 14 interface typically in excess of 200 Megabytes per second and online storage capacity in excess of 10 terabytes on a single system 16 is presently not uncommon. Collectively, the data storage systems 16 are often geographically distributed to reduce access latency, distribute load, and ensure that power and network disruptions do not compromise the entire function of the system 10.

Conventionally, a storage system manager 24 is executed on the storage system platform 20 to implement a virtualization of the physical, typically disk drive-based storage units 221-N present in the local storage system 16. The storage system manager 24 performs the real to virtual translations necessary to support the presentation of data storage units to the computer systems 12 for use as, in effect, standard SCSI-based LUNs. This virtualization of the internal LUN storage allows a more efficient utilization of the physical storage units 221-N through logical aggregation into a contiguous container storage space. The container may be dynamically reconfigured and expanded depending on demand patterns without materially affecting the ongoing use of a particular data storage system 16 by the computer systems 12; the presentation of the data storage units can be preserved even while maintenance is performed on an array of physical storage units 221-N.

Figure 2:
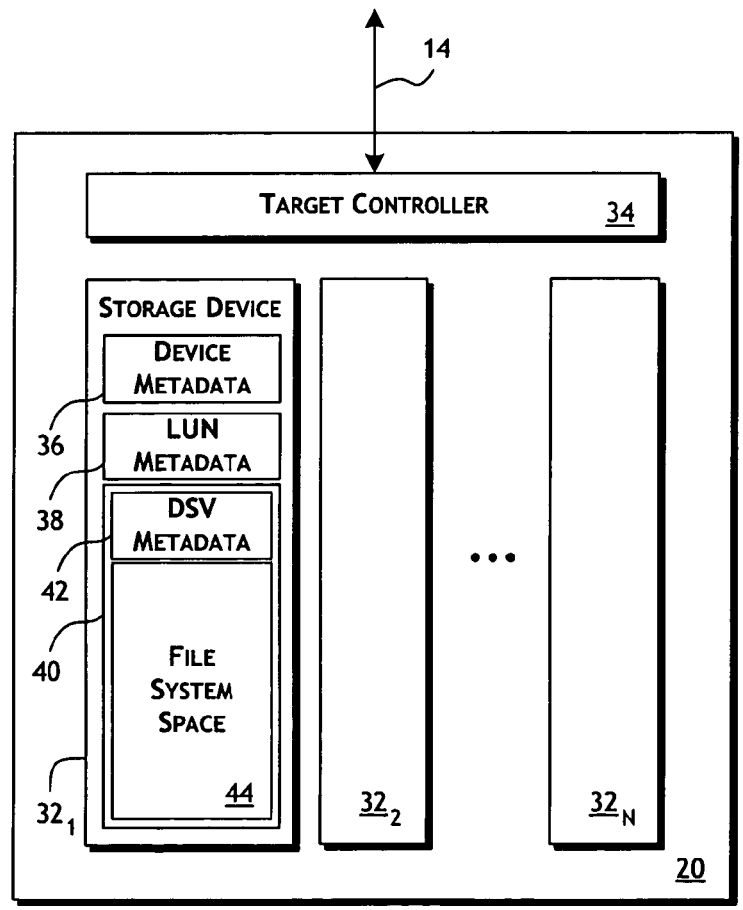
FIG. 2 is a block diagram of a SAN data storage device as implemented for use in conjunction with a preferred embodiment of the present invention.

FIG. 2 provides a logical view 30 of a data storage system 16 implemented in accordance with a preferred embodiment of the present invention. As viewed from outside of the SAN 14, the data storage platform 18 logically presents an array of LUNs 321-N, as data storage units, accessible through a network accessible target controller adapter 34. Consistent with conventional SCSI LUN devices, each of the LUNs 321-N internally store device and LUN metadata in a vendor specific manner, which may be accessed using standard SCSI commands, such as SCSI Inquiry to retrieve the LUN identifier. Functionally, for purposes of discussion, the device and LUN metadata can be described as being contained in a device metadata table 36 and a LUN metadata table 38. The set of LUN metadata is also vendor specific with an information content appropriately defined and maintained, in the present context, the storage system manager 24.

Figure 3:
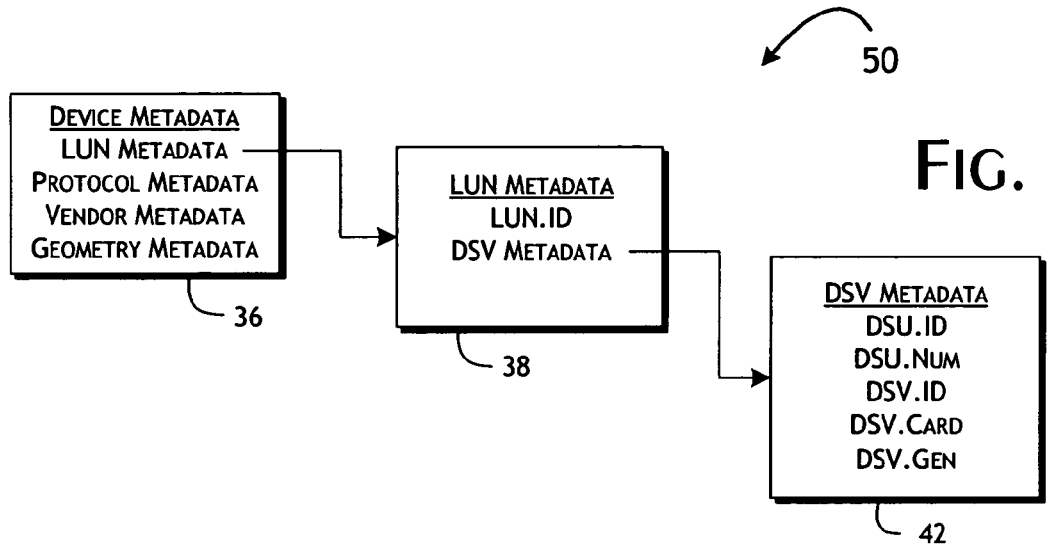
FIG. 3 is a block diagram detailing the association of multiple levels of device metadata as implemented in a preferred embodiment of the present invention.

As further detailed in FIG. 3, the device metadata table 36 stores information that defines the structure of the virtualized device. This information includes the command level protocol that is recognized by the virtualized device, vendor identification data, and data describing the data storage space geometry including details such as block size and defect extents and replacements. The device metadata table 36 also functionally includes a reference to the LUN metadata table 38. The principal data stored by the LUN metadata table 38 is the LUN identifier. For SCSI-3 devices, the LUN identifier is a multi-byte value that is automatically generated and stored to the LUN metadata table 38 as part of the initial LUN provisioning procedures. The LUN metadata table 38 also maintains a typically table-based set of indirect reference values that functionally identify the location of the data storage space 40 within the LUN 321-N.

In accordance with the present invention, a data storage volume (DSV) metadata table 42 is established within the data storage space 40 in conjunction with an otherwise conventional filesystem space 44. Following the provisioning of a particular LUN 321-N, filesystem control structures are typically initialized within the filesystem space 44. The DSV metadata table 42 is preferably established outside of the logical address space of the filesystem space 44, though at a known offset from the beginning of the data storage space 40. Accordingly, the location of the DSV metadata table 42 is determinable in relation to the LUN metadata table 38, as generally indicated in FIG. 3.

A DSV metadata table 42, constructed in accordance with the present invention and as shown in FIG. 3, preferably contains the following values:

DSU.ID: Nominally a copy of the LUN identifier value. Identifier of the current data storage unit. Required. A multi-byte value consistent with the definition of the SCSI LUN identifier value.

DSU.Num: Positional value identifying the ordering of this DSU within a data storage volume (DSV). Required. Preferably a 64-bit value.

DSV.ID: A globally unique identification value for the DSV. Required. Preferably a 128-bit value.

DSV.Card: Cardinality value identifying the number of DSUs contained in this DSV. Optional. Preferably a 64-bit value.

DSV.Gen: Progressive value identifying the generation of this DSV. Required. Preferably a 64-bit value.

For the preferred embodiments of the present invention, the contents of the DSV metadata table 42 are populated and used through the execution of a re-signaturing management program preferably implemented as part of or as an adjunct to a host-based logical volume manager (LVM). Consistent with the present invention, separate instances of the re-signaturing management program can be independently executed among a distributed set of hosts, while fully and consistently achieving the results of any one instance being executed, as described below.

Figure 4:
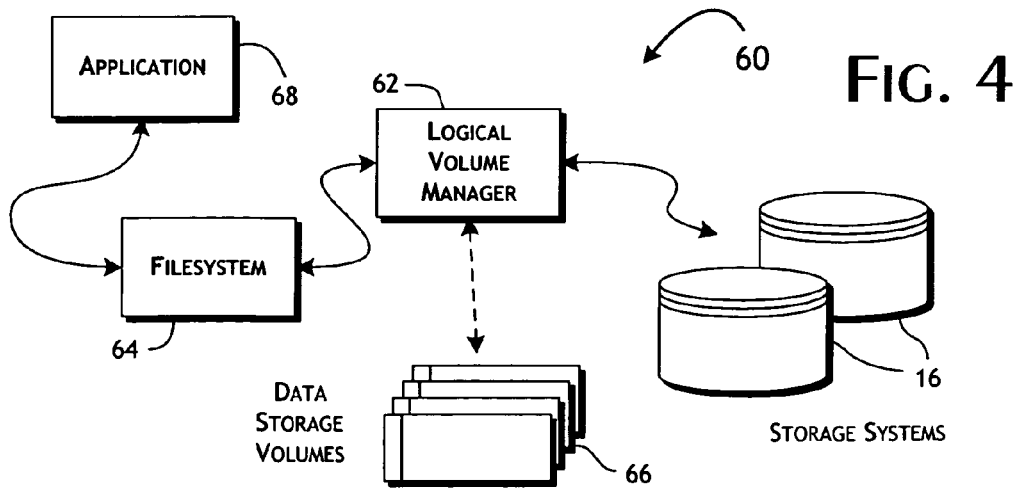
FIG. 4 is a block diagram illustrating the distributed filesystem and logical volume management architecture utilized by a preferred embodiment of the present invention.

As generally illustrated in FIG. 4, a typical system architecture 60 implements a logical volume manager 62 on a computer system 12, that is, at a system tier above the data storage systems 16, as a software layer beneath a local filesystem layer 64. By execution of the logical volume manager 62, the filesystem layer 64 is presented with a data storage view represented by one or more discrete data storage volumes 66, each of which is capable of containing a complete filesystem data structure. The specific form and format of the filesystem data structure is determined by the particular filesystem layer 64 employed. For the preferred embodiments of the present invention, physical filesystems, including the New Technology filesystem (NTFS), the Unix filesystem (UFS), the VMware Virtual Machine filesystem (VMFS), and the Linux third extended filesystem (ext3FS), may be used as the filesystem layer 64.

As is conventional for logical volume managers, each of the data storage volumes 66 is functionally constructed by the logical volume manager 62 from an administratively defined set of one or more data storage units representing LUNs. Where the LUN storage, at least relative to the logical volume manager 62, is provided by network storage systems 16, the data storage volumes 66 are assembled from an identified set of the data storage units externally presented by the network storage systems 16. That is, the logical volume manager 62 is responsible for functionally managing and distributing data transfer operations to the various data storage units of particular target data storage volumes 66. The operation of the logical volume manager 62, like the operation of the storage system manager 24, is transparent to applications 68 executed directly by computer systems 12 or by clients of computer systems 12.

Figure 5:
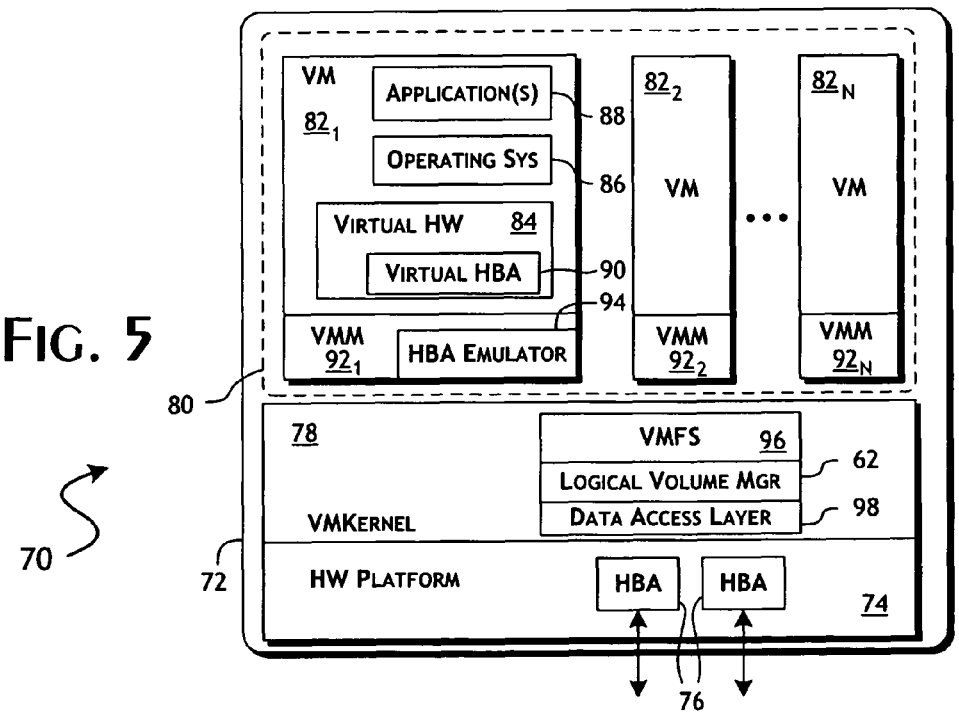
FIG. 5 is a detailed architectural block diagram illustrating a virtual machine-based filesystem and logical volume manager as implemented in a preferred embodiment of the present invention.

A preferred system architecture 60, implementing a virtual machine based system 70, is shown in FIG. 5. An integral computer system 72, generally corresponding to one of the computer systems 12, is constructed on a conventional, typically server-class hardware platform 74, including in particular host bus adapters 76 in addition to conventional platform processor, memory, and other standard peripheral components (not separately shown). The server platform 74 is used to execute a virtual machine (VMKernel) operating system 78 supporting a virtual machine execution space 80 within which virtual machines (VMs) 821-N are executed. For the preferred embodiments of the present invention, the virtual machine kernel 78 and virtual machines 821-N are implemented using the ESX Server product manufactured and distributed by VMware, Inc., Palo Alto, Calif. Use of the ESX Server product and, further, implementation using a virtualized computer system 12 architecture, is not required in the practice of the present invention.

In summary, the virtual machine operating system 78 provides the necessary services and support to enable concurrent execution of the virtual machines 821-N. In turn, each virtual machine 821-N implements a virtual hardware platform 84 that supports the execution of a guest operating system 86 and one or more typically client application programs 88. For the preferred embodiments of the present invention, the guest operating systems 86 are instances of Microsoft7 WindowsJ, LinuxJ and NetwareJ-based operating systems. Other guest operating systems can be equivalently used. In each instance, the guest operating system 86 includes a native filesystem layer, typically either an NTFS or ext3FS type filesystem layer. These filesystem layers interface with the virtual hardware platforms 84 to access, from the perspective of the guest operating systems 86, a data storage host bus adapter. In the preferred implementation, the virtual hardware platforms 84 implements virtual host bus adapters 90 that provide the appearance of the necessary system hardware support to enable execution of the guest operating system 86 transparent to the virtualization of the system hardware.

Filesystem calls initiated by the guest operating systems 86 to implement filesystem-related data transfer and control operations are processed and passed through the virtual host bus adapter 90 to adjunct virtual machine monitor (VMM) layers 921-N that implement the virtual system support necessary to coordinate operation with the virtual machine kernel 78. In particular, a host bus emulator 94 functionally enables the data transfer and control operations to be ultimately passed to the host bus adapters 76. The system calls implementing the data transfer and control operations are passed to a virtual machine filesystem (VMFS) 96 for coordinated implementation with respect to the ongoing operation of all of the virtual machines 821-N. That is, the native filesystems of the guest operating systems 86 perform command and data transfer operations against virtual SCSI devices presenting LUNs visible to the guest operating systems 86. These virtual SCSI devices are based on emulated LUNs actually maintained as files resident within the storage space managed by the virtual machine filesystem 96. In this respect, the virtual machine filesystem 96 is to the virtual machines 82,1-N what the storage system 16 is to the physical computer systems 12. Permitted guest operating system 86 command and data transfer operations against the emulated LUNs are mapped between the LUNs visible to the guest operating systems 86 and the data storage volumes visible to the virtual machine filesystem 96. A further mapping is, in turn, performed by a virtual machine kernel-based logical volume manager 62 to the LUNs visible to the logical volume manager 62 through the data access layers 98, including device drivers, and host bus adapters 76.

Figure 6:
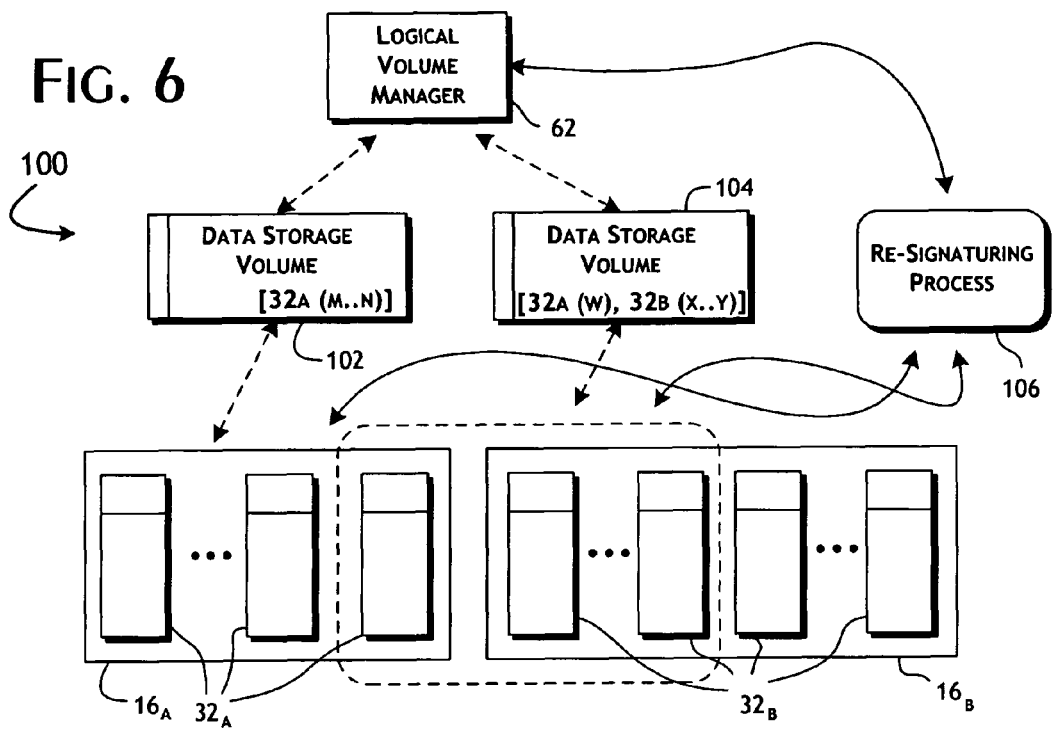
FIG. 6 is a block diagram illustrating the potential association of logical data storage volumes across multiple SAN storage devices and the process association that allows reassembly in accordance with a preferred embodiment of the present invention.

FIG. 6 illustrates the preferred operation of the present invention in the autonomous recognition and reassembly 100 of data storage volumes arising from snapshot replication of LUNs by conventional network storage systems 16. In the example illustrated, two network storage systems 16A,B are represented hosting corresponding sets of LUNs 32A,B. A defined set of the LUNs 32A, denoted 32A (M . . . N), are recognized by the logical volume manager 62 as a first exemplary data storage volume 102. A second defined set, denoted 32A (W), 32B (X . . . Y), are recognized as constituting a second exemplary data storage volume 104 that spans the network storage systems 16A,B. As is conventional, the individual network storage systems 16A,B separately perform snapshot replication of their LUN sets LUNs 32A,B. The replication instances of the LUNs identified as 32A (M . . . N, W) are created within the virtual storage space of the network storage system 16A, while replication instances of the LUNs identified as 32B (X . . . Y) are created within the virtual storage space of the network storage system 16B.

In accordance with the preferred embodiments of the present invention, a re-signaturing process 106 is executed as part of or in conjunction with the logical volume manager 62. The re-signaturing process 106 preferably executes at intervals to recognize replicated instances of LUNs corresponding to known data storage volumes 102, 104 and to autonomously perform re-signaturing of the replicated LUNs to enable reassembly of discrete replication sets as generationally related data storage volumes 102', 104'. Once re-signatured, the data storage volumes 102', 104' will exist without any required dependency on the original replicated data storage volumes 102, 104.

Recognition of the replicated instances is preferably performed by the re-signaturing process 106 executing, at intervals, a bus scan against the network storage systems 16A,B visible to the logical volume manager 62. The bus scan allows the re-signaturing process 106 to identify all of the data storage units available for consideration. Subsequent SCSI Inquiry commands directed to the discovered data storage units is performed by the re-signaturing process 106 to retrieve LUN identification information. The information contained in the DSV metadata tables 42 is also retrieved, using SCSI read commands, for examination as needed to identify replicated data storage units requiring re-signaturing. Once updated DSV metadata is determined by the re-signaturing process 106, the updated metadata is written to the DSV metadata tables 42 of the affected sets of data storage units using SCSI write commands. The logical volume manager 62 can thereafter reference the updated sets of data storage units as generationally related data storage volumes 102', 104'. Preferably, atomicity in the re-signaturing process 106 for individual data storage units is ensured by guarding the read and write operations issued against a particular data storage unit with SCSI Reserve and SCSI Release commands.

Figure 7A:
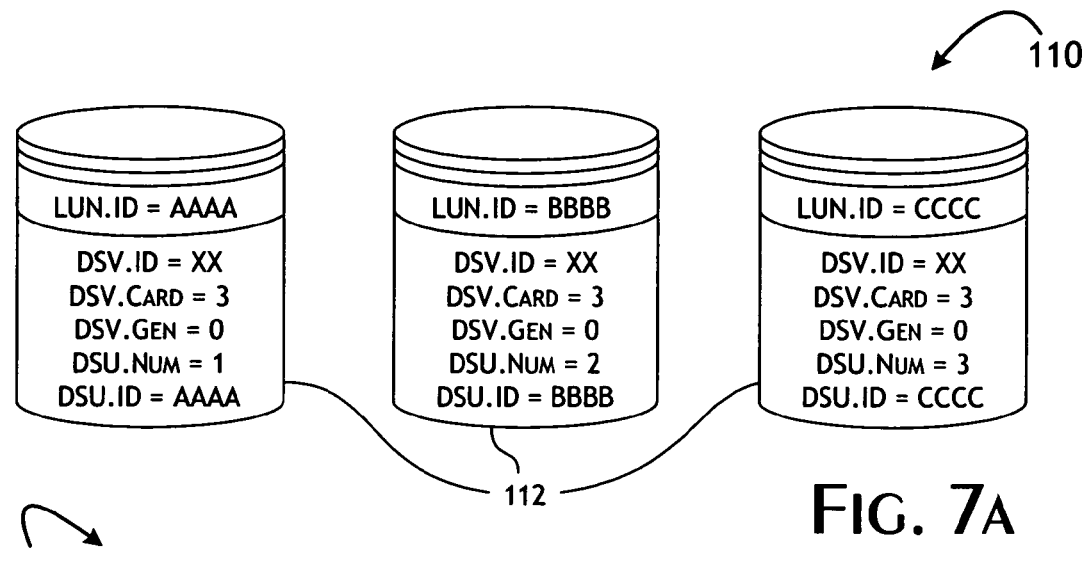
FIGS. 7A-C detail a preferred replication and reassembly progression as implemented in a preferred embodiment of the present invention.
Figure 7B:
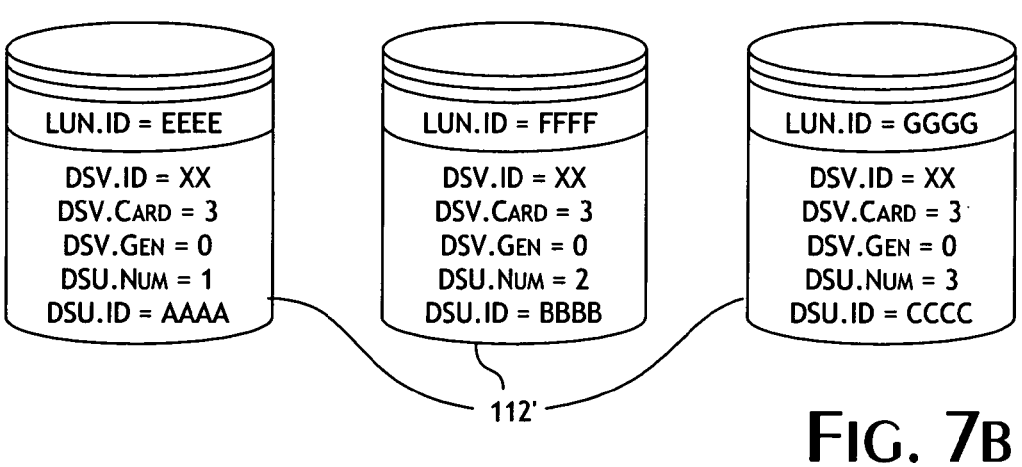
Figure 7C:
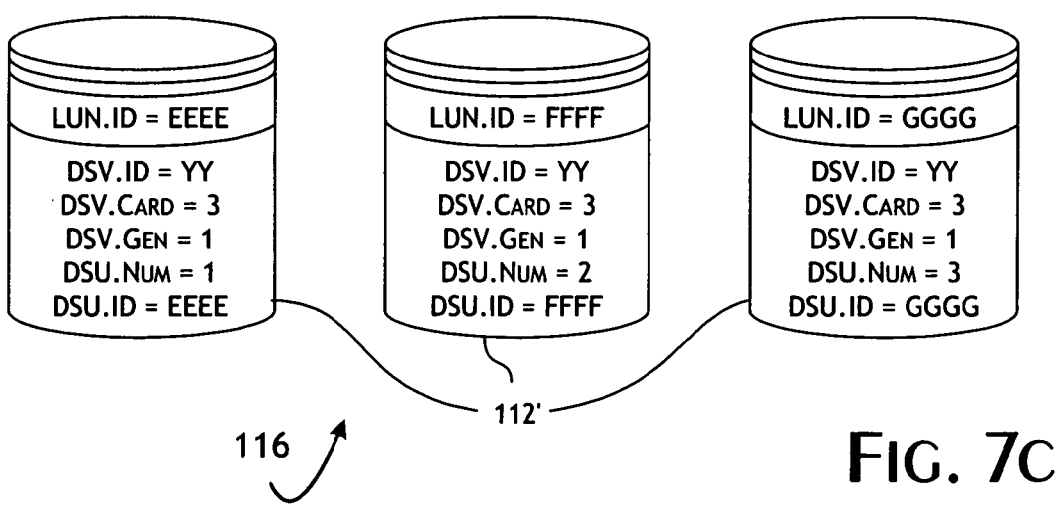

The re-signaturing and assembly of generationally related data storage volumes 102', 104' is detailed in FIGS. 7A-C. Referring to FIG. 7A, an exemplary data storage volume 110 consists of three data storage units 112, uniquely identified by LUN identifiers (LUN.IDs) AAAA, BBBB, CCCC. The DSV metadata uniformly identifies the data storage units 112 as belonging to a unique data storage volume identified as XX and as an original or zero generation instance of the data storage volume 110.

Snapshot replication implemented by the containing network storage system 16 produces a replicated set of data storage units including the replicated instances 112', as shown in FIG. 7B. In provisioning the replicated instances 112', new, unique LUN identifiers EEEE, FFFF, GGGG are automatically created and assigned to the data storage units 112' as is conventional under the SCSI command protocol. The DSV metadata tables 42 are copied without change to the replicated instance data storage units 112'. At least by the inconsistency between the LUN identifiers and DSU.ID values maintained in the corresponding DSV metadata tables 42, the replicated instance data storage units 112' are autonomously identifiable as requiring re-signaturing.

As reflected in the DSV metadata values shown in FIG. 7C, the re-signaturing process 106 executes to update the DSV metadata tables 42 in the replicated instance data storage units 112' to render the data values consistent and permit reassembly as a data storage volume without conflict with the existing data storage units 112 of the zero generation data storage volume. Specifically, the DSU.ID value is conformed, and a unique generation number is assigned. Optionally, a new unique volume identifier is generated, YY, and applied. Where a data storage volume is intended to be held inactive pending use in a rollback, the copied data storage volume identifier DSV.ID is preferably not modified. Since, under rollback circumstances, the current and rollback target volumes will not be active concurrently, but rather the intent of the rollback is to identically restore state to the point in time of the rollback target volume, maintaining the DSV.ID unchanged will allow direct substitution of the rollback target volume for the current volume without concern for conflict.

Conversely, if reassembled data storage volumes are to be used to provide concurrent access to current data and data current as of different replication points in time, then the storage volume identifier of appropriate sets of data storage units may be jointly updated to unique values. Of course, the DSV.ID value re-signaturing may be deferred until such time as the volume is required for use. Depending on the actual use desired, the DSV.ID value may be left unchanged or updated to a unique value at the time the data storage volume is activated by the logical volume manager 62. While, in general application, the preference is to defer updating of the DSV.ID value, the value is shown as updated in FIG. 7C. The resulting data storage volume 116 can then be recognized and managed by the logical volume manager, including activation and mounting, without conflicting with the existing zero generation data storage volume 110. In this case, the data storage volume can and is preferably uniquely identified using the <DSV.ID, DSV.Gen> value tuple. Further, the resulting data storage volume 116, once activated by the logical volume manager 62, can itself be subject to snapshot replication. That is, a generationally derived data storage volume 116, when re-deployed as a primary copy, can be recursively treated as a zero generation data storage volume 110 subject to, in turn, replication and re-signaturing.

A more involved example of the operation 120 of the present invention is provided in FIG. 8. A currently active, generation zero data storage volume 122 is provided by the data storage systems 16. In response to a checkpoint event, snapshot copies 124 of the data storage units comprising the volume 122 are created. The data storage units 124 are identical copies of the data storage units that comprise the generation zero data storage volume 122 with the exception of having unique LUN identifiers. In response typically to a timer event, the re-signaturing process 106 proceeds to re-signature the LUNs 124 by conforming the DSU.ID values to match the LUN identifiers and incrementing the generation DSV.Gen to a unique value for the data storage volume.

In typical operation, the sequence of data storage units replication by the data storage systems 16 and the operation of the re-signaturing process 106 is consistent and ordered. For example, replication may be administratively set to occur at a defined time within each 24 hour period. The re-signaturing process 106 may be administratively set to occur at one if not multiple times within each 24 hour period to ensure that replicated data storage units are timely available for use. Typical ordered operation is generally represented by the ordered replication and re-signaturing of the first and second generation data storage volumes 124' and 126'. The present invention, however, handles the out-of-order circumstance where multiple replications occur before a re-signaturing process 106 is performed or, alternately, is able to complete.

As illustrated in FIG. 8, the operations giving rise to the third and fourth replication generations 128, 130 occur prior to the performance of the re-signaturing process 106. The delay in performing re-signaturing may arise from a number of different causes, including the non-execution of the computer systems 12 that access the data storage volume 120, fault conditions related to the logical volume manager 62 that prevent appropriate access by the re-signaturing process 106 to the data storage volume 120 and replicated data storage units sets 128, 130, or a communications failure between the computer systems 12 and data storage systems 16 that prevents concurrent access to the all of the data storage units required to assemble a particular replicated data storage volume 128, which may more frequently occur where a part of the volume is spread across different physical data storage systems 16, as illustrated in FIG. 6 in relation to the logical volume 104. As shown in FIG. 8, re-signaturing of the third generation data storage volume 128' proceeds after the re-signaturing of the fourth generation data storage volume 130'. To achieve autonomous operation, the present invention provides for recognition of the replication creation order of the data storage units as marked by the inception date of the LUN provisioning. Additional verification of the completeness of potential data storage units sets is preferably recognized from the sequential series defined by the DSU.Num values and, where implemented, the DSV.Card value. Again, the re-signatured data storage volume generations 124', 126', 128', 130', once activated, are functionally equivalent independently to the generation zero data storage volume 122 with respect to being subject to autonomous replication and re-signaturing in accordance with the present invention.

Figure 9:
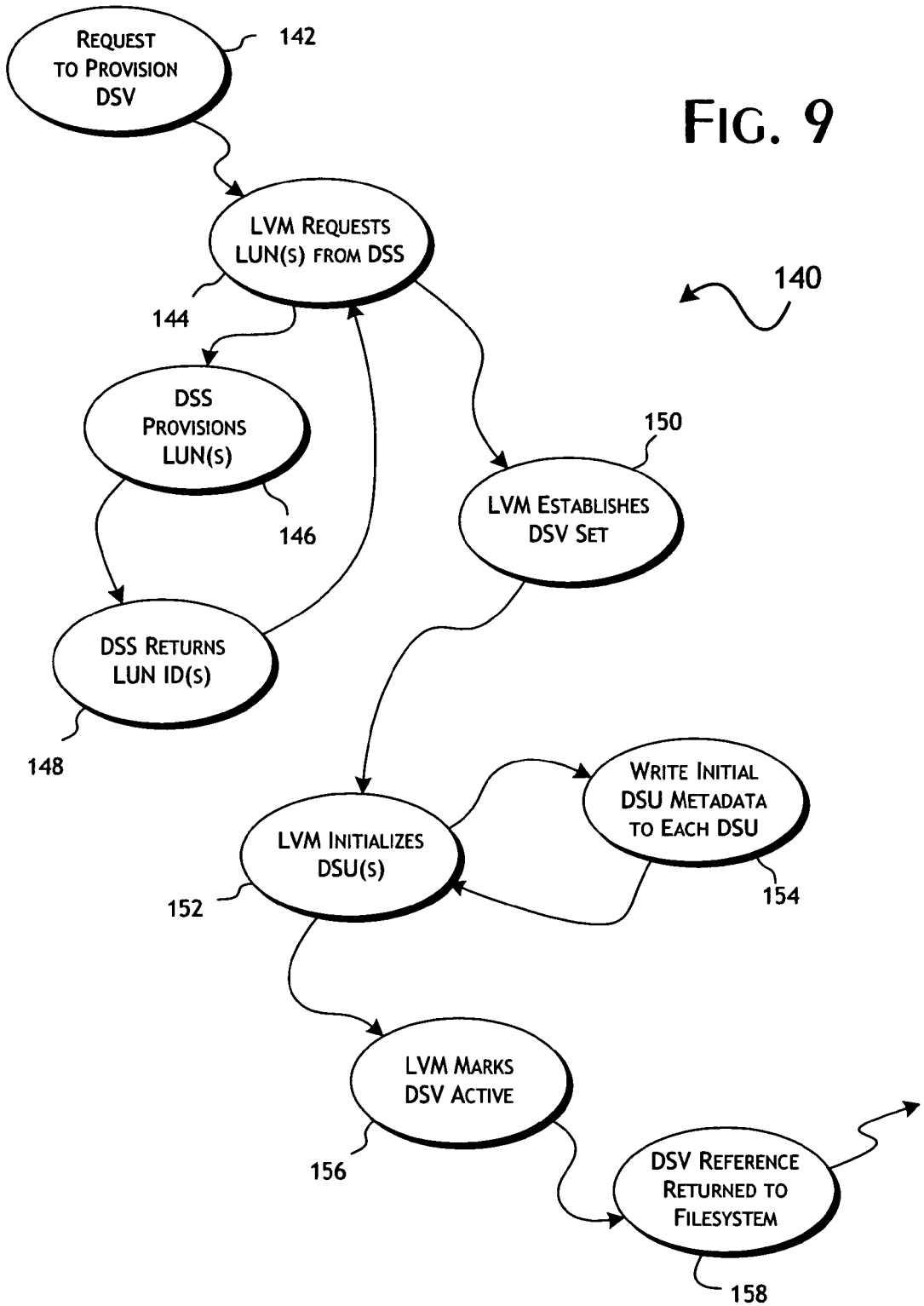
FIG. 9 provides a state flow diagram that illustrates a process of data storage unit replication as generally implemented in conjunction with a preferred embodiment of the present invention.

A preferred process 140 for establishing the DSV metadata tables 42 in connection with the provisioning of LUNs is provided in FIG. 9. Typically, an administrative request is initially made 142 to provide a storage space for a computer system 12. Conventionally, an administrative application is provided to interact with the logical volume manager 62 to request 144 allocation of one or more data storage units from the data storage systems 16. In response, the data storage systems 16 provision, as required, one or more data storage units 146 totaling the requested data storage capacity. The corresponding LUN identifiers are then retrieved 148 by the logical volume manager 62 and the creation of a corresponding data storage volume is completed 150.

The logical volume manager then initializes 152 the LUN control structures required for use of the data storage volume by a computer system 12. In accordance with the present invention, the DSV metadata tables 42 are also created and initialized within the data storage units. Specifically, the DSV metadata tables 42 are allocated within the control structures of the LUN data storage spaces 40 and initialized with the values of the LUN identifiers. A unique data storage volume identifier is generated and written as the DSV.ID values in each of the DSV metadata tables 42. A zero generation value is assigned as the DSV.Gen value. Each data storage unit is assigned a sequential DSU.Num within the data storage volume and, where used, the cardinality value of the data storage volume is written as the DSV.Card value in each of the DSV metadata tables 42.

Once the data storage volume is initialized, the logical volume manager 62 will typically mark each of the individual data storage units comprising the data storage volume as active 156. In turn, the logical volume manager 62 will present the corresponding data storage volume as active 158 to the associated filesystem layer 64, effectively enabling use by the computer systems 12.

Figure 10:
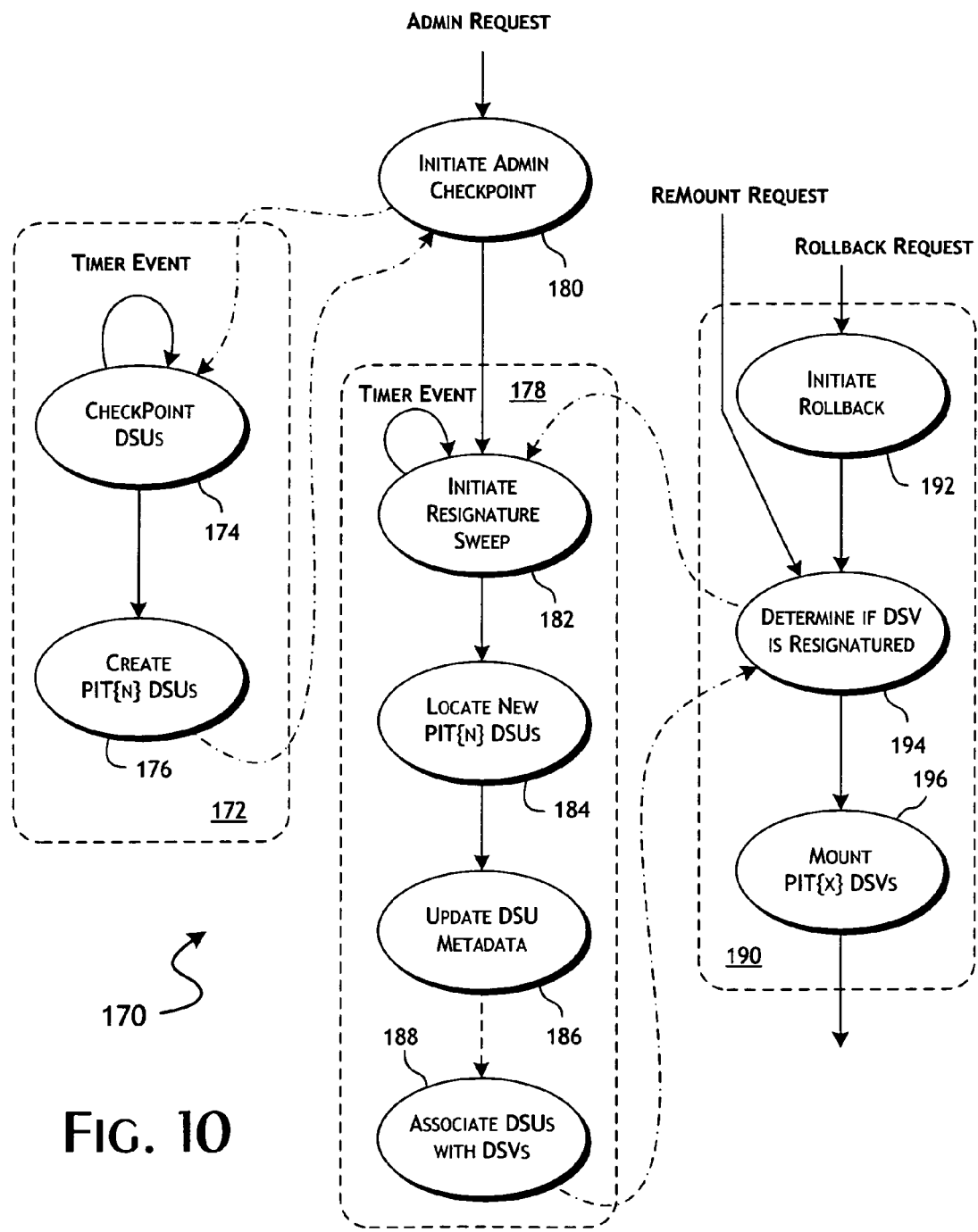
FIG. 10 presents a state flow diagram illustrating the related processes of re-signaturing a data storage volume to support reassembly as implemented in a preferred embodiment of the present invention.

The processes 170 involved with the ongoing utilization of the present invention are shown in FIG. 10. Although subject to proprietary details as conventionally implemented by different commercial data storage system vendors, a replication process 172 is typically executed by the storage system manager 24 independently on each of the data storage systems 16. The replication process 172 may be instigated in response to an administrative request issued from the computer systems 12. Additionally, for the preferred embodiments of the present invention, the replication process 172 also executes autonomously in response to a timer event or at intervals determined preferably by a chronologically scheduled task, such as supported by a conventional cron-based daemon application. In response to an event occurrence, a data storage system 16 instance will typically determine a set of local data storage units that are enabled for replication 174. A typically proprietary replication operation is applied to create new point-in-time data storage unit copies 176. As is conventional, the replicated data storage units are assigned new LUN identifiers consistent with the SCSI protocol for provisioning new LUNs.

The re-signaturing process 178 is initiated either administratively 180 or in response to a timer event, preferably established as a chronologically scheduled task invoked from a conventional cron-based daemon application or equivalent. The re-signaturing process 178 may be executed independently by any number of different computer systems 12. Since the re-signaturing operation is well-defined by the information derived from the data storage units themselves, even overlapping execution by multiple computer systems 12 is permitted.

In response to the initiating event 182, an executing instance of the re-signaturing process 178 will first perform 184 a bus scan to identify data storage units visible to the logical volume manager 62 responsible for the execution of the re-signaturing process 178. In a preferred embodiment of the present invention, the data storage units pending re-signaturing are first identified by differences in the LUN.ID and DSU.ID of the data storage units as retrieved in connection with the bus scan 184. To then re-signature these visible data storage units, the DSV metadata tables 42 are updated to conform the DSU.ID value and increment the DSV.Gen value to reflect the generation of the point-in-time snapshot 186. In an alternate embodiment of the present invention, where multiple LUN replications may occur before an execution of the re-signaturing process 178, different generations of point-in-time snapshots may be distinguished by a replication or other timestamp distinguishing the set creation of new point-in-time data storage unit copies 176. Preferably, the DSV.Gen value is incremented to a value that ensures the tuple <DSV.ID, DSV.Gen> is unique. Finally, provided that all members of a unique volume and generation set <DSV.ID, DSV.Gen> are visible, a logical volume manager 62 can activate the corresponding data storage volume 188. In accordance with the present invention, activation 188 of a data storage volume can be performed by a logical storage manager 62 as executed by any of the computer systems 12.

The principal steps of a preferred re-signaturing process 178 are presented in pseudo-code in the following Tables I through III. The initial step, as represented by the exemplary pseudo-code presented in Table I, includes performing a bus scan to establish an input set S identifying all of the data storage units then visible to a particular logical volume manager 62. Each data storage unit in the set S is then examined to determine if re-signaturing is required and the corresponding DSV metadata table 42 updated, as appropriate. Each examination and update is preferably performed as an atomic operation. Consequently, this first step can and preferably is asynchronously executed without conflict by any number of different logical volume managers 62.

TABLE I

```
Input S = { all DSUs visible to the logical volume manager };
for each DSU d in S do {
    reserve DSU d;
    if (d.LUN.ID <> d.DSU.ID) {
        d.DSV.Gen = d.DSV.Gen + 1;
        d.DSU.ID = d.LUN.ID;
        commit d.DSU.ID and d.DSV.Gen to DSU d;
    }
    release DSU d;
}
```

In a second step, as represented by the exemplary pseudo-code presented in Table II, LUNs corresponding to the same data storage volume are then further updated to segregate the data storage units into sets distinguished by generation.

TABLE II

```
input S = { all DSUs visible to the logical volume manager };
    for each DSU d in S, do {
        if (d.LUN.ID == d.DSU.ID) {
            S' = S - {d};
            for each DSU d' in S', do
                reserve DSU d'=;
                if ( d.DSV.ID == d'.DSV.ID and
                     d.DSV.Gen == d'.DSV.Gen and
                     d'.LUN.ID == d'.DSU.ID ) then {
                         d'.DSV.Gen = d'.DSV.Gen + 1;
                         commit d'.DSV.Gen to DSU d';
                }
                release DSU d'=;
        }
    }
```

At this point, the DSV metadata tables 42 have been updated to mutually associate the data storage units belonging to the same generational data storage volume. The pseudo-code in Table III outlines a data storage volume discovery algorithm that can be subsequently executed by any logical volume manager 62 to discover all data storage volumes then available for use by any of the computer systems 12 at that point in time. This discovery algorithm will recognize the data storage units already processed by the steps presented in Tables I and II.

TABLE III

```
input S = { all DSUs visible to the logical volume manager };
output V = { NULL }; // empty set to hold discovered DSVs
A = Associative array indexed by the DSV primary key <DSV.ID,
DSV.Gen>;
for each DSU d in S, do {
    if (d.DSU.ID == d.LUN.ID) then {
        A<d.DSV.ID, d.DSV.Gen> =
        A<d.DSV.ID, d.DSV.Gen> ∪ {d};
    }
}
for each set of DSUs s in A<i, j> {
    print "Discovered DSV s";
    V = V ∪ s;
}
```

At this point, the re-signatured data storage units are uniquely identifiable to the logical volume manager 62 as independent data storage volumes, but also readily recognized as members of a consistent replication series of data storage volumes. The integrity of the data storage volumes, internally and as between the replicated and generation zero data storage volume is assured.

A subsequent rollback or remount request is handled as illustrated in the process flow 190. In the event of a rollback request, the conventional steps 192 necessary to unmount a current, presumably generation zero data storage volume are performed. A target data storage volume is then selected 194 for mounting. Optionally, the selection process may invoke an iteration of the re-signaturing process 178 to ensure that all currently replicated LUNs are re-signatured and available for mounting. The selected target data storage volume is then mounted 196.

The process flow 190 can also be used to simply mount a prior point-in-time data storage volume for access by a computer system 12. The rollback preparation step 192 is not required. In the selection step 194, an option is preferably offered and nominally accepted to further update the DSV metadata tables 42 of a selected point-in-time data storage volume to assign a unique volume identifier. By further re-signaturing a data storage volume with a unique volume identifier, the logical storage manager 62 is preferably able to mount the data storage volume with full data modification rights. Optionally, the assignment of a unique volume identifier is accompanied by resetting the DSV.Gen generation value.

Thus, a system and method providing for the autonomous re-signaturing data storage volumes of automatically replicated LUNs has been described. While the present invention has been described particularly with reference to data storage units representing SAN virtualized LUNs, the present invention is equally applicable to data storage systems that implement data storage unit directly as physical LUNs. In addition, the present invention can be applied to data storage systems that virtualize complete data storage volumes, rather than just data storage units. In this case, the re-signaturing process executes against the single combined data storage entity.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

What is claimed is:

1. A method for maintaining a replication of a logical data volume accessible by a computer system, wherein the logical data volume comprises at least one logical data storage unit that is backed by a logical unit number (LUN) that is created and exposed to the computer system by a network storage system, the method comprising:

identifying a replication of the LUN,
wherein the LUN stores (i) a LUN identifier that is generated and inserted into the LUN by the network storage system, and (ii) a volume identifier identifying the logical data volume and a data storage unit identifier identifying the logical data storage unit and corresponding to the LUN identifier, wherein the volume identifier and the data storage unit identifier are generated during a creation of the logical data volume by a system in communication with the network storage system, and
wherein the replication (a) was automatically created by the network storage system based on a pre-existing backup policy, (b) is stored as a separate LUN having a LUN identifier generated by the network storage system that is different from the LUN identifier of the LUN, but (c) has a volume identifier and a data storage unit identifier that have the same values as the volume identifier and the data storage unit identifier of the LUN, respectively, as a result of a copying of data in the LUN to the separate LUN in order to create the replication; and modifying the value of the data storage unit identifier of the replication to correspond to the value of the LUN identifier of the separate LUN, thereby enabling the computer system to recognize the replication as separate from the LUN.

2. The method of claim 1, wherein (i) the LUN and the replication further store version identifiers that indicate a version of the logical data volume to which the LUN or replication relate, respectively, and (ii) the method further comprises incrementing the version identifier of the replication to indicate that the replication contains a later version of the logical data volume than the LUN.

3. The method of claim 1, further comprising modifying the value of the volume identifier of the replication such that the volume identifier indicates that the replication relates to a logical data volume different from the logical data volume.

4. The method of claim 1, wherein the step of identifying further comprises scanning the network storage system to identify each LUN created by the network storage system that stores a data storage unit identifier that differs from a LUN identifier of the LUN.

5. The method of claim 4, wherein the scanning is performed periodically.

6. The method of claim 1, wherein at least one computer system using the logical data volume comprises a virtualization layer that stores virtual disk files in the logical data volume on behalf of virtual machines running on top of the virtualization layer.

7. The method of claim 1, wherein volume identifier of the LUN and the data storage unit identifier of the LUN are stored in an area of the LUN that is separate from a file system in the LUN that store data in the logical data storage volume for the computer system.

8. A computer system configured to maintain a replication of a logical data volume accessible by the computer system, wherein the logical data volume comprises at least one logical data storage unit that is backed by a logical unit number (LUN) that is created and exposed to the computer system by a network storage system, the computer system comprising a processor configured to perform the steps of:

identifying a replication of the LUN,
wherein the LUN stores (i) a LUN identifier that is generated and inserted into the LUN by the network storage system, and (ii) a volume identifier identifying the logical data volume and a data storage unit identifier identifying the logical data storage unit and corresponding to the LUN identifier, wherein the volume identifier and the data storage unit identifier are generated during a creation of the logical data volume by a system in communication with the network storage system, and
wherein the replication (a) was automatically created by the network storage system based on a pre-existing backup policy, (b) is stored as a separate LUN having a LUN identifier generated by the network storage system that is different from the LUN identifier of the LUN, but (c) has a volume identifier and a data storage unit identifier that have the same values as the volume identifier and the data storage unit identifier of the LUN, respectively, as a result of a copying of data in the LUN to the separate LUN in order to create the replication; and modifying the value of the data storage unit identifier of the replication to correspond to the value of the LUN identifier of the separate LUN, thereby enabling the computer system to recognize the replication as separate from the LUN.

9. The computer system of claim 8, wherein (i) the LUN and the replication further store version identifiers that indicate a version of the logical data volume to which the LUN or replication relate, respectively, and (ii) the process is further configured to perform the step of incrementing the version identifier of the replication to indicate that the replication contains a later version of the logical data volume than the LUN.

10. The computer system of claim 8, wherein the processor is further configured to perform the step of modifying the value of the volume identifier of the replication such that the volume identifier indicates that the replication relates to a logical data volume different from the logical data volume.

11. The computer system of claim 8, wherein the step of identifying further comprises scanning the network storage system to identify each LUN created by the network storage system that stores a data storage unit identifier that differs from a LUN identifier of the LUN.

12. The computer system of claim 11, wherein the scanning is performed periodically.

13. The computer system of claim 1, wherein at least one other computer system using the logical data volume comprises a virtualization layer that stores virtual disk files in the logical data volume on behalf of virtual machines running on top of the virtualization layer.

14. The computer system of claim 1, wherein volume identifier of the LUN and the data storage unit identifier of the LUN are stored in an area of the LUN that is separate from a file system in the LUN that store data in the logical data storage volume for the computer system.

15. A non-transitory machine readable storage medium comprising instructions executable in a computer system to cause the computer system to carry out a method for maintaining a replication of a logical data volume accessible by a computer system, wherein the logical data volume comprises at least one logical data storage unit that is backed by a logical unit number (LUN) that is created and exposed to the computer system by a network storage system, the method comprising:

identifying a replication of the LUN,
wherein the LUN stores (i) a LUN identifier that is generated and inserted into the LUN by the network storage system, and (ii) a volume identifier identifying the logical data volume and a data storage unit identifier identifying the logical data storage unit and corresponding to the LUN identifier, wherein the volume identifier and the data storage unit identifier are generated during a creation of the logical data volume by a system in communication with the network storage system, and wherein the replication (a) was automatically created by the network storage system based on a pre-existing backup policy, (b) is stored as a separate LUN having a LUN identifier generated by the network storage system that is different from the LUN identifier of the LUN, but (c) has a volume identifier and a data storage unit identifier that have the same values as the volume identifier and the data storage unit identifier of the LUN, respectively, as a result of a copying of data in the LUN to the separate LUN in order to create the replication; and modifying the value of the data storage unit identifier of the replication to correspond to the value of the LUN identifier of the separate LUN, thereby enabling the computer system to recognize the replication as separate from the LUN.

16. The non-transitory machine readable storage medium of claim 15, wherein (i) the LUN and the replication further store version identifiers that indicate a version of the logical data volume to which the LUN or replication relate, respectively, and (ii) the method further comprises incrementing the version identifier of the replication to indicate that the replication contains a later version of the logical data volume than the LUN.

17. The non-transitory machine readable storage medium of claim 15, wherein the method further comprises the step of modifying the value of the volume identifier of the replication such that the volume identifier indicates that the replication relates to a logical data volume different from the logical data volume.

18. The non-transitory machine readable storage medium of claim 15, wherein the step of identifying further comprises scanning the network storage system to identify each LUN created by the network storage system that stores a data storage unit identifier that differs from a LUN identifier of the LUN.

19. The non-transitory machine readable storage medium of claim 18, wherein the scanning is performed periodically.

20. The non-transitory machine readable storage medium of claim 15, wherein volume identifier of the LUN and the data storage unit identifier of the LUN are stored in an area of the LUN that is separate from a file system in the LUN that store data in the logical data storage volume for the computer system.

* * * * *